United States Patent
Kato et al.

(10) Patent No.: US 7,805,035 B2
(45) Date of Patent: Sep. 28, 2010

(54) FORMING METHOD OF REFRACTIVE INDEX MATCHING FILM

(75) Inventors: Yoshihisa Kato, Hitachi (JP); Kanako Suzuki, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 17 days.

(21) Appl. No.: 12/021,326

(22) Filed: Jan. 29, 2008

(65) Prior Publication Data
US 2008/0131061 A1      Jun. 5, 2008

(30) Foreign Application Priority Data
Jul. 31, 2006      (JP) .............................. 2006-208358

(51) Int. Cl.
  *G02B 6/32* (2006.01)
  *G02B 6/00* (2006.01)
(52) U.S. Cl. ........................................ 385/33; 264/1.26
(58) Field of Classification Search .................. 385/33; 264/1.24–1.26
See application file for complete search history.

(56) References Cited

U.S. PATENT DOCUMENTS 4,253,730 A * 3/1981 Logan et al. ................... 385/66
4,784,466 A    11/1988 Khoe et al.

FOREIGN PATENT DOCUMENTS

| CN | 101025461 | 8/2007 |
|---|---|---|
| DE | EP0014960 A1 * | 9/1980 |
| JP | 62-75407 | 4/1987 |
| JP | 01-166007 | 6/1989 |
| JP | 04-104108 | 4/1992 |
| JP | 7-294779 | 11/1995 |
| JP | 10-221547 | 8/1998 |
| JP | 11-72641 | 3/1999 |
| JP | 11-101919 | 4/1999 |
| JP | 2004-184957 | 7/2004 |
| JP | 2005-275049 | 10/2005 |

OTHER PUBLICATIONS

Chinese Office Action dated Apr. 7, 2010 for Application No. CN 101025461A.

* cited by examiner

*Primary Examiner*—Charlie Peng
(74) *Attorney, Agent, or Firm*—Antonelli, Terry, Stout & Kraus, LLP.

(57) ABSTRACT

A forming method of a refractive index matching film comprises steps: one end of an optical fiber is brought into contact with a liquid surface of a photo-curable refractive index matching solution; curing reaction light is made incident to the opposite end of the optical fiber and is emitted through the one end of the optical fiber so as to cure preliminarily the photo-curable refractive index matching solution in contact with the one end of the optical fiber; the curing reaction light is tentatively stopped; the one end of the optical fiber is separated from the liquid surface of the photo-curable refractive index matching solution; and the curing reaction light is made incident again from the opposite end of the optical fiber so as to cure the preliminarily cured photo-curable refractive index matching solution and form a refractive index matching film.

3 Claims, 2 Drawing Sheets

FORMING METHOD OF REFRACTIVE INDEX MATCHING FILM

BACKGROUND OF THE INVENTION

1. Field of the Invention

The present invention relates to a forming method of a refractive index matching film used in an optical connector and, more particularly, to a forming method of a refractive index matching film that can reduce a connection loss caused by a temperature change and repetitive attachment and detachment of an optical fiber, and that can be formed easily. Furthermore, the present invention relates to an optical connector that uses the refractive index matching film.

2. Description of Related Art

When optical fibers are interconnected, ends of the both optical fibers are often made to mutually face or ferrules, into each of which an optical fiber is inserted, are made to mutually face. Connection members used in these types of connection include a mechanical splice and optical connector. The mechanical splice is effective for a long-term connection, and the optical connector is effective when the connection is frequently attached and detached. Regardless of which of these connection members is used, two optical fiber ends are mutually brought into physical contact, so a thrust force is applied in the axial direction of each optical fiber.

In these connection methods, the shape and/or state of the optical fiber end thus largely affects the connection characteristics. For example, if an angle of the optical fiber end relative to the axial direction of the optical fiber is not within an appropriate range or a state of a surface of the optical fiber end is rough, air remains at the clearance in the connection part, in which case Fresnel reflection at the connection end increases and thus the connection loss increases.

In known connection methods, as described in JP-A Hei 11 (1999)-72641 and JP-A Hei 11 (1999)-101919, to avoid this problem, a refractive index matching material in a liquid or grease state is applied to an end of an optical fiber to be connected, the refractive index of the refractive index matching material having the same or approximately the same refractive index as a core of the optical fiber. In this method, a refractive index matching material is applied to the end of an optical fiber to be connected or supplied into the connection part, and the optical fiber is made to face another optical fiber to be connected to the optical fiber. This method thereby keeps air out of their connection ends and avoids the Fresnel reflection that would otherwise be caused by air, reducing the connection loss. In other known methods as described in JP-A Hei 07 (1995)-294779, JP-A Hei 10 (1998)-221547 and JP-A-2005-275049, photo-curable resin is applied to the optical fiber end and cured instead of the refractive index matching material in a liquid or grease state being applied or supplied.

In the interconnection work of optical fibers, however, the optical fibers are often attached and detached repeatedly so that their optical axes are aligned. Accordingly, some problems arise in the conventional methods, as described below.

When optical fibers are repeatedly attached and detached in a method in which a silicone or paraffinic refractive index matching material in a liquid or grease state is applied to the connection end of one of the optical fibers, the amount of refractive index matching material between the optical fiber ends decreases and thus voids and bubbles are likely to be generated between the ends, greatly increasing a connection loss. Another problem is that the refractive index matching material may be lost due to volatilization, exudation, etc. over the long term. Furthermore, when holey fibers are connected, since the refractive index matching material is in a liquid or grease state, it is easy to enter hollows of the holey fibers, greatly changing the transfer loss of the holey fibers. In addition, since it reduces the amount of refractive index matching material in the connection part, voids and bubbles are likely to be generated between the ends, greatly increasing a connection loss.

In the method, described in JP-A Hei 07 (1995)-294779, in which photo-curable resin is applied to an optical fiber end and cured, an optical fiber end is immersed into in a liquid material and then pulled out upward. After that, a drop-shaped liquid material on the optical fiber end is cured. In this case, there is a problem that the liquid material is prone to adhere to the side of the optical fiber and becomes solidified. In addition, it is difficult to form a film with a desired thickness on the end surface.

As described in JP-A Hei 10 (1998)-221547, an optical fiber end is immersed into a vessel filled with photo-curable resin, light for curing the resin is emitted through the immersed fiber end, and then the distance from the bottom of the vessel to the optical fiber end is controlled so as to control the film thickness. In this method as well, however, there is a problem that the photo-curable resin adheres to the side of the optical fiber and becomes solidified. The document of JP-A Hei 10 (1998)-221547 also describes a method in which a cured material formed in a liquid is attached to the optical fiber end, rather than immersing the end into the vessel. However, it is difficult to control the shape of the cured material formed in the liquid.

As described in JP-A-2005-275049, an end of optical fiber is oriented upward and a liquid drop of photo-curable resin is applied to the end surface and cured. If an attempt is made to restrict the liquid drop within the end surface, the thickness of the resin is restricted. If the thickness of the resin is increased by repeatedly applying and curing liquid drops of the photo-curable resin, the liquid drops are prone to drip along the side.

SUMMARY OF THE INVENTION

Under these circumstances, the present invention is originated to solve the above problems. It is an object of the present invention to provide a forming method of a refractive index matching film that can reduce a connection loss caused by a temperature change and repetitive attachment and detachment of an optical fiber, and that can be formed easily. Furthermore, it is another object of the present invention to provide an optical connector that uses the refractive matching film.

(1) According to one aspect of the present invention, a forming method of a refractive index matching film comprises steps: one end of an optical fiber is brought into contact with a liquid surface of a photo-curable refractive index matching solution; curing reaction light is made incident to the opposite end of the optical fiber and is emitted through the one end of the optical fiber so as to cure preliminarily the photo-curable refractive index matching solution in contact with the one end of the optical fiber; the curing reaction light is tentatively stopped; the one end of the optical fiber is separated from the liquid surface of the photo-curable refractive index matching solution; and the curing reaction light is made incident again from the opposite end of the optical fiber so as to cure the preliminarily cured photo-curable refractive index matching solution and form a refractive index matching film.

In the above invention (1), the following modifications and changes can be made.

(i) The forming method further comprises a step that the one end of the optical fiber is lifted above the liquid surface to an extent, in which the photo-curable refractive index matching solution is not cut from the one end of the optical fiber by a surface tension of the liquid, adjacently after the step that the one end of the optical fiber is brought into contact with the liquid surface of the photo-curable refractive index matching solution.

(ii) The forming method further comprises a step that another curing reaction light is directed toward a surface of the refractive index matching film to completely cure the refractive index matching film, after the step that the curing reaction light is made incident again from the opposite end of the optical fiber.

(iii) The forming method further comprises a step that the one end of the optical fiber is cut at right angles with the axis of the optical fiber, before the step that the one end of the optical fiber is brought into contact with the liquid surface of the photo-curable refractive index matching solution.

(iv) An optical fiber comprises a refractive index matching film in which the refractive index matching film is formed on one end of the optical fiber by said forming method.

(v) An optical connector includes an optical fiber and a refractive index matching film in which the refractive index matching film is formed on one end of the optical fiber by said forming method.

(vi) The optical fiber is accommodated in a ferrule of the optical connector.

(vii) The optical fiber is fixed together with another optical fiber through the refractive index matching film.

ADVANTAGES OF THE INVENTION

The present invention exhibits excellent advantages as described below.

(a) The connection loss caused by a temperature change is small.

(b) The connection loss remains small even when an optical fiber to be interconnected is repeatedly attached and detached.

(c) A refractive index matching film can be easily formed on an end of an optical fiber.

DETAILED DESCRIPTION OF THE PREFERRED EMBODIMENTS

Preferred embodiments according to the present invention will be described bellow with reference to the accompanying drawings. However, the present invention is not limited to the embodiments described herein.

Structure of Optical-Fiber-End Treating Apparatus

Figure 1:
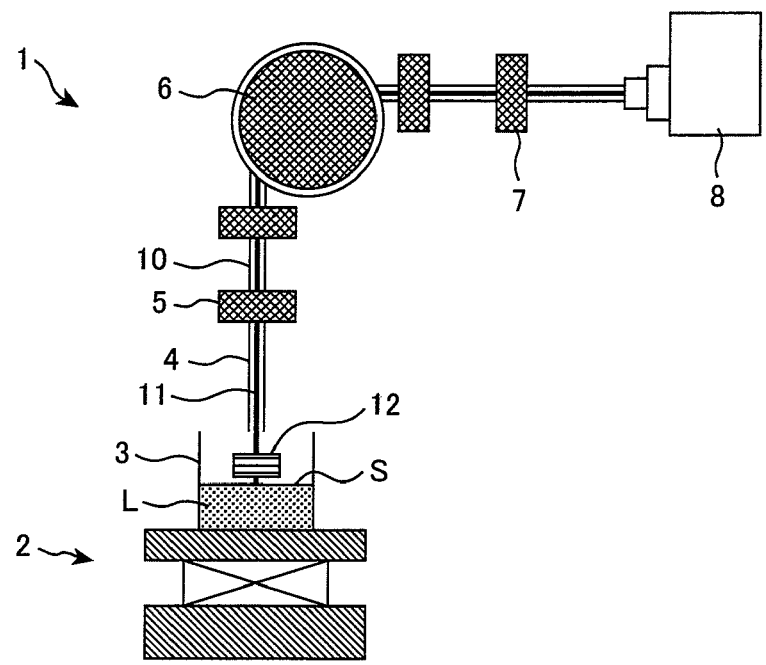
FIG. 1 is a schematic illustration showing an example of a structure of an optical-fiber-end treating apparatus that implements a forming method of a refractive index matching film according to the present invention.

FIG. 1 is a schematic illustration showing an example of a structure of an optical-fiber-end treating apparatus that implements a forming method of a refractive index matching film according to the present invention. As shown in FIG. 1, the optical-fiber-end treating apparatus 1 comprises: a stage 2 with a horizontal plane that can be moved up and down; a raw material vessel 3 that is filled with a photo-curable refractive index matching solution L and is placed on the stage; an optical fiber vertical holding tool 5 that is disposed above the raw material vessel 3 and holds one end of an optical fiber 4 vertically and downward to the raw material vessel 3; a turn pulley 6 that bends the optical fiber 4 in a circular form by an appropriate angle (e.g., by 90 degrees); an optical fiber holding tool 7 that holds the opposite end of the optical fiber 4; a curing reaction light source 8 that makes curing reaction light be incident to the opposite end of the optical fiber 4 for curing the photo-curable refractive index matching solution L through the optical fiber 4; and a guide 12 that is disposed above and in the vicinity of the liquid surface S of the photo-curable refractive index matching solution L and suppresses horizontal vibration of the optical fiber 4. The optical fiber 4 is an optical fiber used for information transfer; it may be a quartz single-mode fiber, multi-mode fiber, holey fiber, or the like. Plastic fiber may also be used.

The photo-curable refractive index matching solution L is cured by a light such as ultraviolet or visible light (referred to as curing reaction light below). After the photo-curable refractive index matching solution L has been cured, the refractive indexes of the optical fibers can be matched so that the optical fibers are interconnected with a small loss. There is no restriction on the material of the photo-curable refractive index matching solution L if the material does not affect the transfer characteristics when the optical fibers are interconnected. It is preferable that the photo-curable refractive index matching solution L can be cured by ultraviolet light. A thermosetting refractive index matching solution may be used together with the photo-curable refractive index matching solution L. The photo-curable refractive index matching solution L preferably has a refractive index of 1.4 to 1.5 in a liquid state, because its refractive index increases by 0.01 to 0.05 after it has been cured. The photo-curable refractive index matching solution L preferably has an optical permeability of 80% or more for the wavelength of light to be transferred. The hardness of the photo-curable refractive index matching solution L after it has been cured is preferably 90 or less (Shore A). The photo-curable refractive index matching solution L is similar to the liquid material and the photo-curable resin described in Patent Documents of JP-A Hei 07 (1995)-294779, JP-A Hei 10 (1998)-221547 and JP-A-2005-275049 in that it is cured by light. However, the solution L according to the present invention differs from them in that it is used to match the refractive indexes of optical fibers to be interconnected.

If the curing of the photo-curable refractive index matching solution L is likely to be impeded by oxygen in the air, it is advisable to place the raw material vessel 3 in, for example, an inertia atmosphere such as a nitrogen gas. The curing reaction light source 8 is preferably an ultraviolet lamp equipped with a shutter (not shown) so that light is directed or shut off by opening or closing the shutter, respectively.

Forming Method of Refractive Index Matching Film

Figure 2:
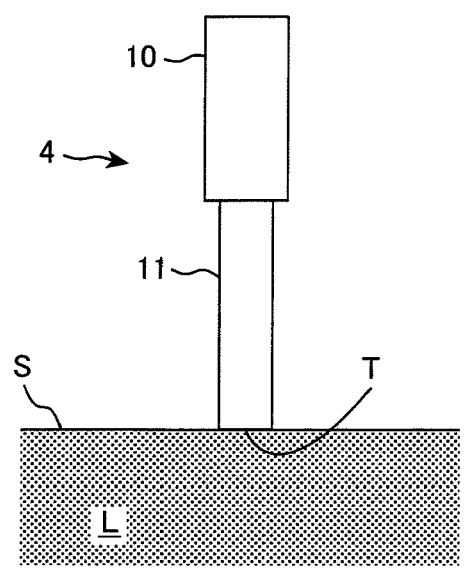
FIG. 2 is a schematic illustration showing a partial enlarged view of the optical-fiber-end treating apparatus in FIG. 1.

Next, a procedure for forming the refractive index matching film will be described with reference to FIGS. 1 to 3.

At first, an optical fiber 4 with a prescribed length of L1 (e.g., 400 to 500 mm) is prepared. A sheath 10 of the optical fiber 4 is removed by another prescribed length of L2 (e.g., 150 to 200 mm) from an end so that a glass strand 11 is exposed.

An end of the glass strand 11 is cut at right angles with the axis of the optical fiber 4 for preparing a surface on which to form a refractive index matching film. In this right-angle cutting, an end within an error (an inclination) of 1 degree with respect to an ideal surface is formed, the ideal surface strictly forming right angles with the axis of the optical fiber 4 (glass strand 11). A purpose of performing the right-angle cutting is to enable the thickness and shape of a refractive index matching film formed on the end to be stably controlled with ease. Another purpose of the right-angle cutting is to make it hard for the photo-curable refractive index matching solution L to attach to the side surface of the glass strand 11 when the end surface is brought into contact with the liquid surface S. A commercially available optical fiber cutter can be used to form an end surface cut at right angles.

The optical fiber 4 is cleaned with alcohol or the like and then attached to the optical-fiber-end treating apparatus 1 shown in FIG. 1. Specifically, one end of the optical fiber 4 on the side on which the glass strand 11 is exposed is disposed to the optical fiber vertical holding tool 5, and the opposite end of the optical fiber 4 on the side on which the sheath 10 is left is put in the optical fiber holding tool 7. Of course, the end surface of the optical fiber 4 is sufficiently above the raw material vessel 3 at this point of time. The shutter of the curing reaction light source 8 is closed so that curing reaction light is not directed.

The raw material vessel 3 on the stage 2 is filled with the photo-curable refractive index matching solution L. The end of the optical fiber 4 is brought close to the liquid surface S of the photo-curable refractive index matching solution L by raising the stage 2 in this state. FIG. 2 is a schematic illustration showing a partial enlarged view of the optical-fiber-end treating apparatus in FIG. 1. As shown in FIG. 2, when the end T touches the liquid surface S, the stage 2 is stopped.

Then, the shutter of the curing reaction light source 8 is opened in this state and curing reaction light is directed from the opposite end of the optical fiber 4. The photo-curable refractive index matching solution L is preliminarily cured on the contact interface between the end T of the optical fiber 4 and the photo-curable refractive index matching solution L, starting the formation of a refractive index matching film (not shown in FIG. 2). The refractive index matching film formed at that time is referred to as an initial refractive index matching film.

The shutter of the curing reaction light source 8 is then closed to stop the curing reaction light from being directed, after which the stage 2 is moved down (i.e., the liquid surface S is lowered from the end T of the optical fiber 4) so that the optical fiber 4 is above the liquid surface S. Thus, the initial refractive index matching film is separated from the liquid surface S of the photo-curable refractive index matching solution L. On the end of the optical fiber 4 cut from the liquid surface S, a liquid drop of the photo-curable refractive index matching solution L adheres to the surface of the initial refractive index matching film. As mentioned before, since the optical fiber 4 is held vertically so that it faces downward and the end T is cut at right angles, the liquid drop of the photo-curable refractive index matching solution L forms a rotationally symmetric curved surface, which has a downward convex, around the axis of the optical fiber 4 due to a balance between gravity and surface tension.

After that, the shutter of the curing reaction light source 8 is opened in this state to make curing reaction light be incident from the opposite end of the optical fiber 4. The liquid drop of the photo-curable refractive index matching solution L having the curved surface is cured on the initial refractive index matching film while maintaining its shape, and is integrated to the initial refractive index matching film. Accordingly, a refractive index matching film M, the contour of which is shaped to the curved surface (e.g., see FIGS. 3(a) and 3(b)), is obtained.

FIGS. 3(a) and 3(b) are schematic illustrations showing other partial enlarged views of the optical-fiber-end treating apparatus in FIG. 1, indicating states at different points of time from that of FIG. 1. Furthermore, another curing reaction light source 9 disposed in front of the surface of the shaped refractive index matching film M may be used to emit curing reaction light to the refractive index matching film M so that the refractive index matching film M is completely cured, as shown in FIG. 3(a). Since curing reaction light is directed toward the surface of the refractive index matching film M, the surface of the refractive index matching film M can be sufficiently cured. The refractive index matching film M is formed by the procedure described so far, after which the glass strand 11 is cut at a position apart by a prescribed distance L3 (e.g., 10 to 20 mm) from the end of the refractive index matching film M, as shown in FIG. 3(b), to obtain an inventive optical fiber 31 with the refractive index matching film M.

According to the present invention, a refractive index matching film M with a desired thickness can be easily formed by controlling the thickness of the initial refractive index matching film. For example, the thickness of the initial refractive index matching film can be increased with increasing the intensity of the curing reaction light; the thickness of the initial refractive index matching film can be also increased with prolonging the time during which the curing reaction light is directed. Accordingly, the refractive index matching film M with a target thickness can be finally formed by controlling the intensity of the curing reaction light and the time during which the curing reaction light is directed, according to a pre-measured growth rate at which the initial refractive index matching film is being formed.

If the refractive index matching film M is too thin, when optical fibers are made to mutually face, their ends are brought into a direct contact, in which case the transfer loss may increase. On the contrary, if the refractive index matching film M is too thick, the ends of the optical fibers are too distant from each other, in which case their axes may be misaligned and the transfer loss may also increase. When it becomes possible to form a refractive index matching film M with a desired thickness, the transfer loss (particularly, the connection loss) between the optical fibers can be minimized.

According to the present invention, since the refractive index matching film M is cured, even when there is a change in ambient temperature during practical use, the connection loss dose not increase unlike a refractive index matching material in a liquid or grease state, so the refractive index matching film M can be used for a long period of time. And also, since the refractive index matching film M is cured, even when the optical fibers are repeatedly attached and detached, the amount of the refractive index matching film M does not reduce, unlike a refractive index matching material in a liquid or grease state, so it is possible to suppress the connection loss from increasing. Furthermore, since the liquid does not adhere to the side of the optical fiber, unlike the prior art in Patent Documents of JP-A Hei 07 (1995)-294779, JP-A Hei 10 (1998)-221547 and JP-A-2005-275049, a refractive index matching film M can be stably formed.

In the procedure for forming a refractive index matching film, after the one end T of the optical fiber 4 has been brought into contact with the liquid surface S of the photo-curable refractive index matching solution L, the preliminary curing may be performed and the formation of an initial refractive index matching film may be started while the one end T of the optical fiber 4 is relatively moved up from the liquid surface S (the liquid surface S, i.e., the stage 2 is moved down from the one end T of the optical fiber 4) to an extent in which the photo-curable refractive index matching solution L is not cut from the one end T of the optical fiber 4 and the refractive index matching solution L is lifted to the one end T of the optical fiber 4 by a surface tension. Although the stage 2 in the optical-fiber-end treating apparatus 1 in FIG. 1 has been made capable of being moved up and down, the optical fiber 4 may be made capable of being moved up and down for the liquid surface S of the photo-curable refractive index matching solution L.

(Optical Connector)

Next, the optical connector according to the present invention will be described.

Figure 4:
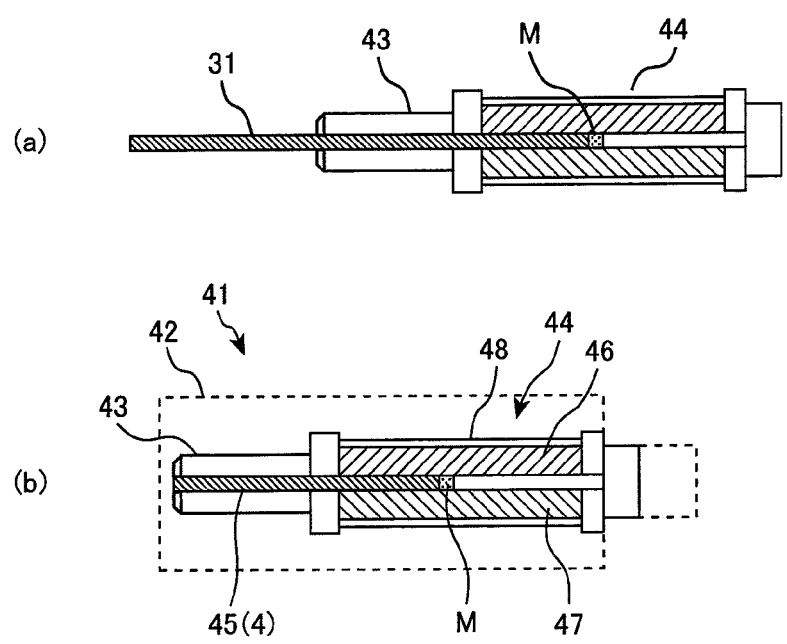
FIGS. 4(a) and 4(b) are schematic illustrations showing a longitudinal cross sectional view of an optical connector according to the present invention, 4(a) the optical connector in a state of manufacturing; and 4(b) an example of the optical connector that has been completed.

FIGS. 4(*a*) and 4(*b*) are schematic illustrations showing a longitudinal cross sectional view of an optical connector according to the present invention, 4(*a*) the optical connector in a state of manufacturing; and 4(*b*) an example of the optical connector that has been completed. As shown in FIG. 4(*b*), in an optical connector 41, a ferrule 43 is accommodated inside the front of a housing 42 (the left side in the drawing), and a clamp portion 44 is provided inside the back of the housing 42 (the right side in the drawing) in such a way that it touches the ferrule 43. A built-in fiber 45 is accommodated from the distal end of the ferrule 43 to an intermediate point of the clamp portion 44. The built-in fiber 45 is the optical fiber 4 in which the refractive index matching film M that has been described so far is formed.

The optical connector 41 is assembled as follows. The optical fiber 31 having the refractive index matching film M that is formed as shown in FIG. 3(*b*) is inserted into the ferrule 43, as shown in FIG. 4(*a*). When the optical fiber 31 having the refractive index matching film M is inserted in such a way that the refractive index matching film M is positioned at an intermediate point of the clamp portion 44, part of the optical fiber 31 with an extra length outwardly extends from the ferrule 43. The extra part is cut and the cut surface is polished together with the ferrule 43.

The end of the built-in fiber 45 in FIG. 4(*b*) has been polished at the distal end (left side in the drawing) of the ferrule 43, as mentioned above. The end of the built-in fiber 45 on which the refractive index matching film M is formed is positioned at an intermediate point of the clamp 44. The clamp portion 44 comprises a pressing plate 46, a V-grooved plate 47, and a plate holder 48. The refractive index matching film M is provided to match the refractive indexes of the built-in fiber 45 and another optical fiber (not shown) in the optical connector 41 and to have these optical fibers face each other.

The optical fiber 41 is interconnected by a procedure described next. Another optical fiber (not shown) to be interconnected is guided from the back of the housing 42 to the intermediate point of the clamp portion 44. The end of the other optical fiber is made to face the end of the built-in fiber 45 (on which the refractive index matching film M is formed) and these optical fibers are brought into mutual physical contact and are placed between the pressing plate 46 and V-grooved plate 47. The plate holder 48 clamps the pressing plate 46 and V-grooved plate 47. Thus, the optical fibers are optically interconnected and physically fixed.

As described above, the optical connector 41 according to the present invention includes an optical fiber 4 having a refractive index matching film M on the surface of one end. The optical fiber 4 is preferably accommodated in the ferrule 43. The optical fiber 4 is preferably fixed and interconnected with another optical fiber through the refractive index matching film M.

EXAMPLES

Example 1

The sheath 10 of a single-mode fiber 4 with 500-mm-long (BBG-SM-WF from Hitachi Cable, Ltd., with an outer diameter of about 250 μm and a fiber (glass strand) diameter of 125±1 μm) was removed by about 200 mm from one end. The surface of the exposed glass strand 11 was cleaned with alcohol, and the end of the glass strand 11 was cut at right angles with the axis of the optical fiber 4 using a fiber cutter. The optical fiber 4 was then attached to the optical-fiber-end treating apparatus 1 shown in FIG. 1.

The raw material vessel 3 was filled with an ultraviolet curing refractive index matching solution L (OPTOKLEB MO5 from ADELL Corporation). One end of the glass strand 11 that had been cut at right angles was positioned above the liquid surface S of the ultraviolet curing refractive index matching solution L, and the opposite end was attached to the curing reaction light source 8 (ultraviolet lamp EX250, with an output of 250 W, from HOYA Corporation). The stage 2 was raised until the end T touched the liquid surface S, and stopped. The shutter of the curing reaction light source 8 was then opened to direct ultraviolet light to the end T through the optical fiber 4 for one minute. After an initial refractive index matching film was formed, the shutter was closed to suspend the curing process and the stage 2 was lowered to separate the optical fiber 4 from the liquid surface S.

The shutter of the curing reaction light source 8 was then opened. The ultraviolet was directed to the end T through the optical fiber 4 for one minute to cure an adhering droplet of the ultraviolet curing refractive index matching solution L, and a refractive index matching film M was formed. After that, curing reaction light was directed for one minute by another curing reaction light source 9 disposed in front of the refractive index matching film M.

Figure 3:
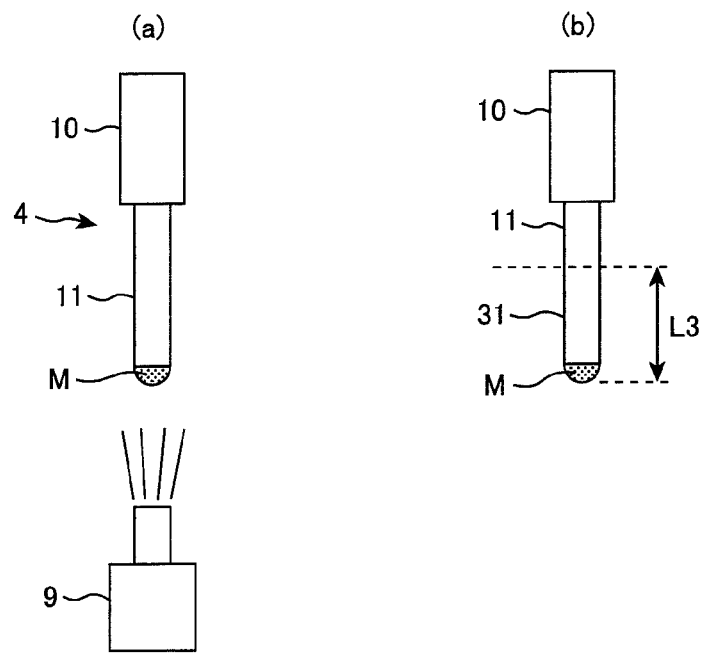
FIGS. 3(a) and 3(b) are schematic illustrations showing other partial enlarged views of the optical-fiber-end treating apparatus in FIG. 1, indicating states at different points of time from that of FIG. 1.

Then, the optical fiber 31 (Example 1), as shown in FIG. 3(*b*), having the refractive index matching film was fabricated by the procedure described in the preferred embodiment and removed from the optical-fiber-end treating apparatus 1. Twenty optical fibers of this type were prepared by repeating the same procedure. Each of these optical fibers 31 having the refractive index matching film was inserted into the ferrule 43 of the optical connector 41 as shown in FIG. 4(*a*), and the optical fiber 31 having the refractive index matching film was cut at the distal end of the ferrule 43 and the cut surface was polished.

A holey fiber (BBG-HF from Hitachi Cable, Ltd., with an outer diameter of about 250 μm and a fiber diameter of 125±1 μm) was used as another optical fiber to be interconnected with Example 1 in the optical connector 41. Its sheath was removed at one end. The exposed glass strand was cleaned with alcohol, and the end of the glass strand was cut at right angles using a fiber cutter. Said another optical fiber was set into the clamp portion 44 of the optical connector 41, and was interconnected to the optical fiber 45 having the refractive index matching film by a mechanical splice.

For prepared 20 optical fibers (Example 1), each of which was accommodated in an optical connector, an initial connection loss at the mechanical splice connection, a return loss, and an increase in loss after the optical connector was left for 24 hours at ordinary temperatures (23±2° C.) were measured. The measurement wavelength was 1550 nm, and the light source was an LED. Five of the 20 optical fibers were subject to temperature and humidity test that was continuously performed at 85° C. for 336 hours, at 60° C. and 95% RH for 336 hours, and then 42 cycles from −40 to 70° C. over a period of 8 hours.

Another five optical fibers were subject to 10 cycles of temperature cycle test, 5 cycles of another temperature/humidity test, and low temperature test, in that order. The temperature cycle test was performed from −40 to 70° C. over a period of 6 hours. One cycle of said another temperature/humidity test was comprised of: 2 cycles from 25 to 65° C. and 95% RH (at 65° C.); one cycle from 25 to −10° C.; and then 2 cycles from 25 to 65° C. and 95% RH (at 65° C.). The low temperature test was performed at −40° C. for 240 hours. Upon the completion of these tests, an increase in loss was measured.

Five of the remaining 10 optical fibers (Example 1) were subject to continuous high-temperature test (at 100° C. for 30 days), after which they were connected to other optical fibers and increase in connection loss were measured. Specifically, after an initial connection loss at ordinary temperatures and other parameters were measured, the connected other optical fiber was removed and the optical fiber of Example 1 was subject to above-mentioned continuous high-temperature test. After the continuous high-temperature test, said other optical fiber was connected again and a connection loss was measured, and thus an increase between the initial connection loss and the connection loss after the test was obtained.

The last five optical fibers were subject to repetitive mechanical splice connection test (twice, five times, and 10 times). An increase in loss from the initial connection loss was measured in each connection.

Example 2

The holey fiber (BBG-HF from Hitachi Cable, Ltd.) was used to prepare 20 optical fibers 4 (Example 2), each of which has a refractive index matching film, with the same length as in Example 1, in the similar way as in Example 1; however, TB3078C from ThreeBond Co., Ltd. was used as the ultraviolet curing refractive index matching solution L. Each of these optical fibers was inserted into the ferrule 43 of the optical connector 41, and the optical fiber having the refractive index matching film was cut at the distal end of the ferrule 43 and the cut surface was polished, as in Example 1.

The holey fiber (BBG-HF from Hitachi Cable, Ltd.) was also used as another optical fiber to be interconnected with Example 2 in the optical connector 41, as in Example 1. Said another optical fiber was disposed in the clamp portion 44 of the optical connector 41, and was interconnected to the optical fiber of Example 2 having the refractive index matching film by a mechanical splice. Test and measurement were performed for the 20 optical fibers with the optical connectors (Example 2), which were obtained as described above, as in Example 1.

Example 3

The single-mode fiber (BBG-SM-WF from Hitachi Cable, Ltd.) was used to prepare 20 optical fibers 4 (Example 3), each of which has a refractive index matching film, with the same length as in Example 1, in the similar way as in Example 1; however, TB3078C from ThreeBond Co., Ltd. was used as the ultraviolet curing refractive index matching solution L. Each of these optical fibers was inserted into the ferrule 43 of the optical connector 41, and the optical fiber having the refractive index matching film was cut at the distal end of the ferrule 43 and the cut surface was polished, as in Example 1.

The single-mode fiber (BBG-SM-WF from Hitachi Cable, Ltd.) was also used as another optical fiber to be interconnected with Example 3 in the optical connector 41 as in Example 1. Said another optical fiber was inserted into the clamp portion 44 of the optical connector 41, and was interconnected to the optical fiber of Example 3 having the refractive index matching film by a mechanical splice. Test and measurement were performed for the 20 optical fibers with the optical connectors (Example 3), which were obtained as described above, as in Example 1.

Comparative Example 1

As in Example 1, the sheath 10 of the single-mode fiber 4 (BBG-SM-WF from Hitachi Cable, Ltd., with an outer diameter of about 250 μm and a fiber diameter of 125±1 μm) was removed by about 200 mm from one end; the surface of the exposed glass strand 11 was cleaned with alcohol; and the end of the glass strand 11 was cut at right angles using a fiber cutter. Twenty optical fibers of this type were prepared; however, the refractive index matching film in the present invention was not formed. Each of these optical fibers was inserted into the ferrule 43 of the optical connector 41; the glass strand 11 was cut at the distal end of the ferrule 43; and the cut surface was polished, as in Example 1. A grease-like refractive index matching material (non-crosslinking refractive index matching material OC-431A-LVP from Nye Lubricants, Inc, with a refractive index of 1.46) was potted in the V-groove in the V-grooved plate 47 on the other end side of the glass strand.

Next, the single-mode fiber (BBG-SM-WF from Hitachi Cable, Ltd.) was prepared as another optical fiber to be interconnected with Comparative example 1 in the optical connector 41 as in Example 1. Said another optical fiber was set into the clamp portion 44 of the optical connector 41, and was interconnected to the glass strand 11 of Comparative example 1 by a mechanical splice. Test and measurement were performed for 10 of 20 optical fibers with optical connectors (Comparative example 1), which were obtained as described above, as in the first Example 1.

Five of the remaining 10 optical fibers with the optical connectors (Comparative example 1) were subject to above-mentioned continuous high-temperature test at 100° C. for 30 days, after which said other optical fibers were connected again and an increase in connection loss was measured for each optical fiber, as in Example 1. The last five optical fibers were subject to repetitive mechanical splice connection test (twice, five times, and 10 times). An increase in loss from the initial connection loss was measured in each connection.

Comparative Example 2

As in Comparative example 1, the sheath 10 of the single-mode fiber 4 (BBG-SM-WF from Hitachi Cable, Ltd., with an outer diameter of about 250 μm and a fiber diameter of 125±1

µm) was removed by about 200 mm from one end; the surface of the exposed glass strand 11 was cleaned with alcohol; and the end of the glass strand 11 was cut at right angles using a fiber cutter. Twenty optical fibers of this type were prepared; however, the refractive index matching film in the present invention was not formed. Each of these optical fibers was inserted into the ferrule 43 of the optical connector 41; the glass strand 11 was cut at the distal end of the ferrule 43; and the cut surface was polished, as in Examples 1 to 3 and Comparative example 1. In addition, grease-like refractive index matching material was potted to the other end of the glass strand 11, as in Comparative example 1.

The holey fiber (BBG-HF from Hitachi Cable, Ltd.) was used as another optical fiber to be interconnected with Comparative example 2 in the optical connector 41, as in Examples 1 and 2. Said another optical fiber was disposed in the clamp portion 44 of the optical connector 41, and was interconnected to the glass strand 11 of Comparative example 2 by a mechanical splice. Test and measurement were performed for the 20 optical fibers with the optical connectors (Comparative example 2), which were obtained as described above, as in Example 1.

Table 1 shows measurement results, in which single-mode fiber and holey fiber are respectively denoted SMF and HF.

dB; and another increase in loss after the repetitive connection test exceeds 0.3 dB with increasing the number of connection. In Comparative example 2, the initial connection loss was so large that other tests to measure an increase in loss did not need to be conducted.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A forming method of a refractive index matching film, comprising the following steps:
   bringing one end of an optical fiber into contact with a liquid surface of a photo-curable refractive index matching solution in a container, without immersing the one end of the optical fiber into the photo-curable refractive index matching solution;
   applying curing reaction light incident to the opposite end of the optical fiber, and emitting the curing reaction light through the one end of the optical fiber so as to preliminarily cure the photo-curable refractive index matching

TABLE 1

| | | Example 1 SMF-HF | Example 2 HF-HF | Example 3 SMF-SMF | Comparative example 1 SMF-SMF | Comparative example 2 SMF-HF |
|---|---|---|---|---|---|---|
| Initial stage (At ordinary temperatures) | Connection loss (dB) | 0.1 to 0.4 | 0.2 to 0.5 | 0.1 to 0.3 | 0.1 to 0.3 | >1.0 |
| | Return loss (dB) | −60 to −45 | −55 to −45 | −60 to −45 | −60 to −45 | −60 to −45 |
| After 24 hours (At ordinary temperatures) | Increase in loss (dB) | 0.00 to 0.02 | 0.00 to 0.03 | 0.00 to 0.02 | 0.00 to 0.02 | — |
| Increase in loss after continuous cyclic temperature and humidity test (dB) | | <0.3 | <0.3 | <0.3 | <0.3 | — |
| Increase in loss after cyclic temperature test (dB) | | <0.3 | <0.3 | <0.3 | <0.3 | — |
| Increase in loss after cyclic temperature and humidity test (dB) | | <0.3 | <0.3 | <0.3 | <0.3 | — |
| Increase in loss after low-temperature test (dB) | | <0.3 | <0.3 | <0.3 | <0.3 | — |
| Increase in connection loss after continuous high-temperature test (dB) | | 0.1 to 0.5 | 0.2 to 0.5 | 0.1 to 0.4 | >1.0 | — |
| Increase in loss after repetitive connection test (dB) | 2 connections | <0.3 | <0.3 | <0.3 | <0.3 | — |
| | 5 connections | <0.3 | <0.3 | <0.3 | 0.2 to 0.5 | — |
| | 10 connections | <0.3 | <0.3 | <0.3 | >1.0 | — |

In Example 1, an SMF and an HF are interconnected; in Example 2, an HF and another HF are interconnected; and in Example 3 an SMF and another SMF are interconnected. As is shown in Table 1, it is revealed that an increase in loss is less than 0.3 dB for Examples 1 to 3 in the standing test at ordinary temperatures, temperature and humidity tests, continuous high-temperature test, and repetitive connection test. These results demonstrate that the connection between the optical fiber 4 and another optical fiber through the refractive index matching film M in the optical connector 41 according to the present invention is superior in durability under severe conditions of temperature and humidity, and can suppress an increase in the connection loss due to the temperature change and/or repeated attachment and detachment of the optical fiber. Thereby, it ensures that optical transmission characteristics of the optical connector are stable over a long period of time.

By contrast, in Comparative example 1, an increase in loss after the continuous high-temperature test is greater than 1.0 solution that is in contact with the one end of the optical fiber due to using surface tension;
tentatively stopping the application of the curing reaction light;
separating the one end of the optical fiber from the liquid surface of the photo-curable refractive index matching solution in the container, wherein a portion of the photo-curable refractive index matching solution is not cut from the one end of the optical fiber and is lifted to the one end of the optical fiber by a surface tension; and
applying curing reaction light incident again from the opposite end of the optical fiber so as to cure the preliminarily cured photo-curable refractive index matching solution attached to the one end of the optical fiber and form a refractive index matching film.

2. The forming method according to claim 1, further comprising directing another curing reaction light toward a surface of the refractive index matching film to completely cure the refractive index matching film, after applying the curing reaction light incident from the opposite end of the optical fiber.

3. The forming method according to claim 1, further comprising cutting the one end of the optical fiber at right angles with the axis of the optical fiber, before bringing the one end of the optical fiber into contact with the liquid surface of the photo-curable refractive index matching solution.

* * * * *